United States Patent Office 2,874,713
Patented Feb. 24, 1959

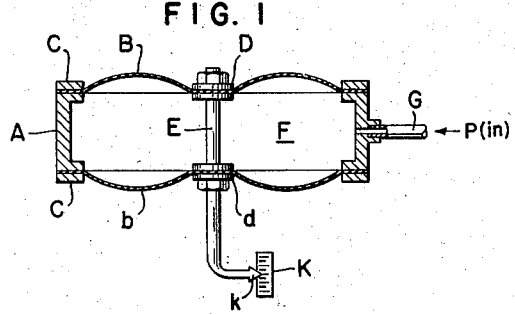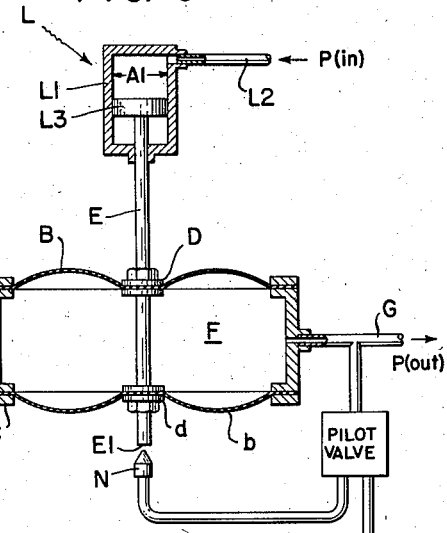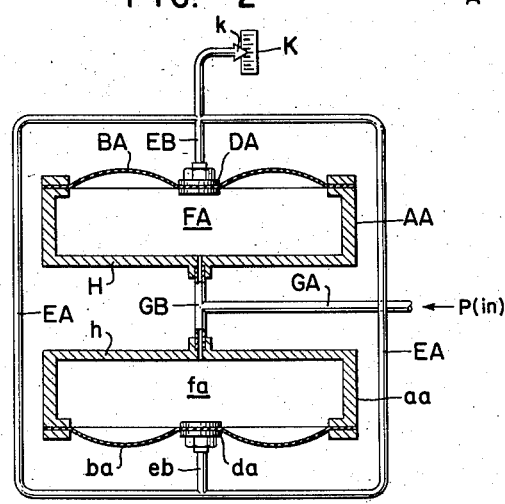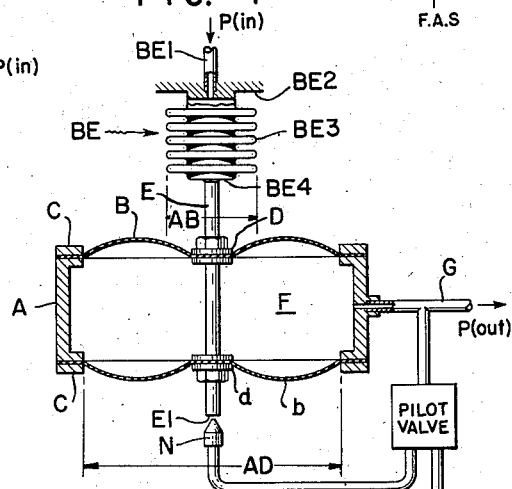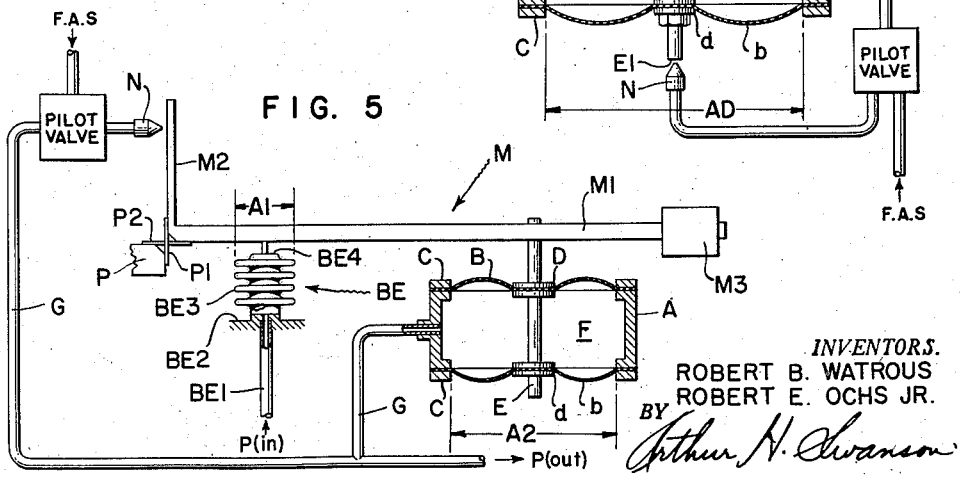

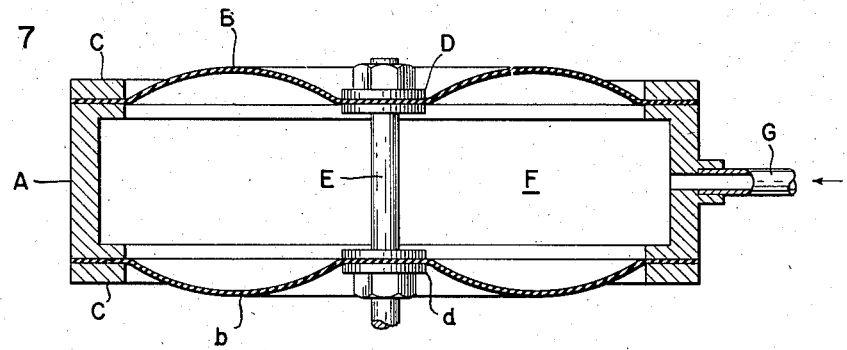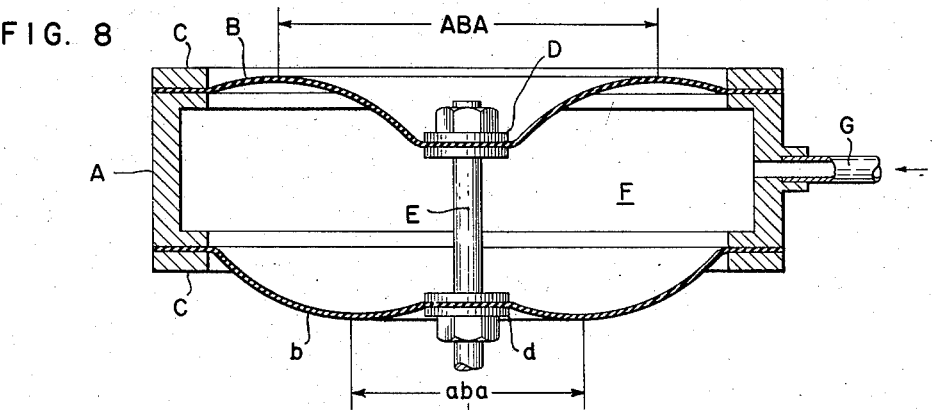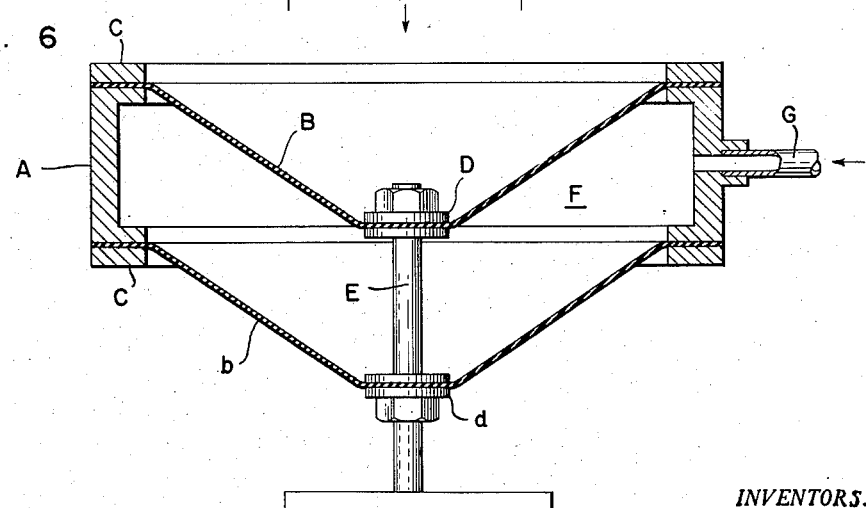

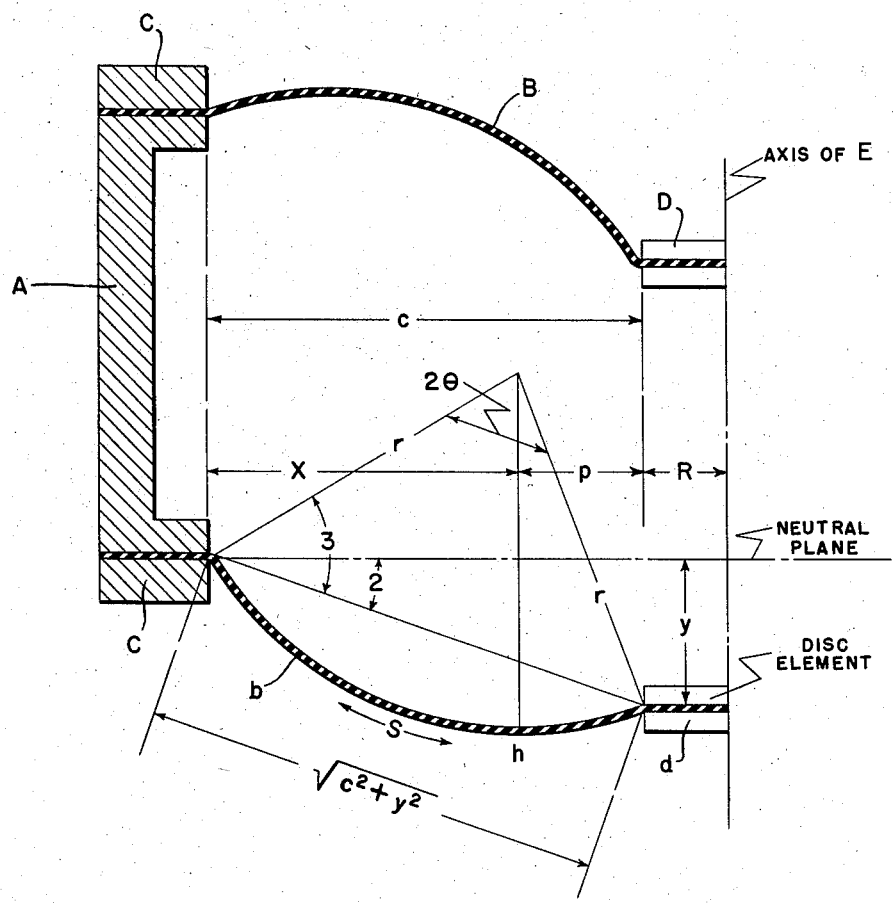

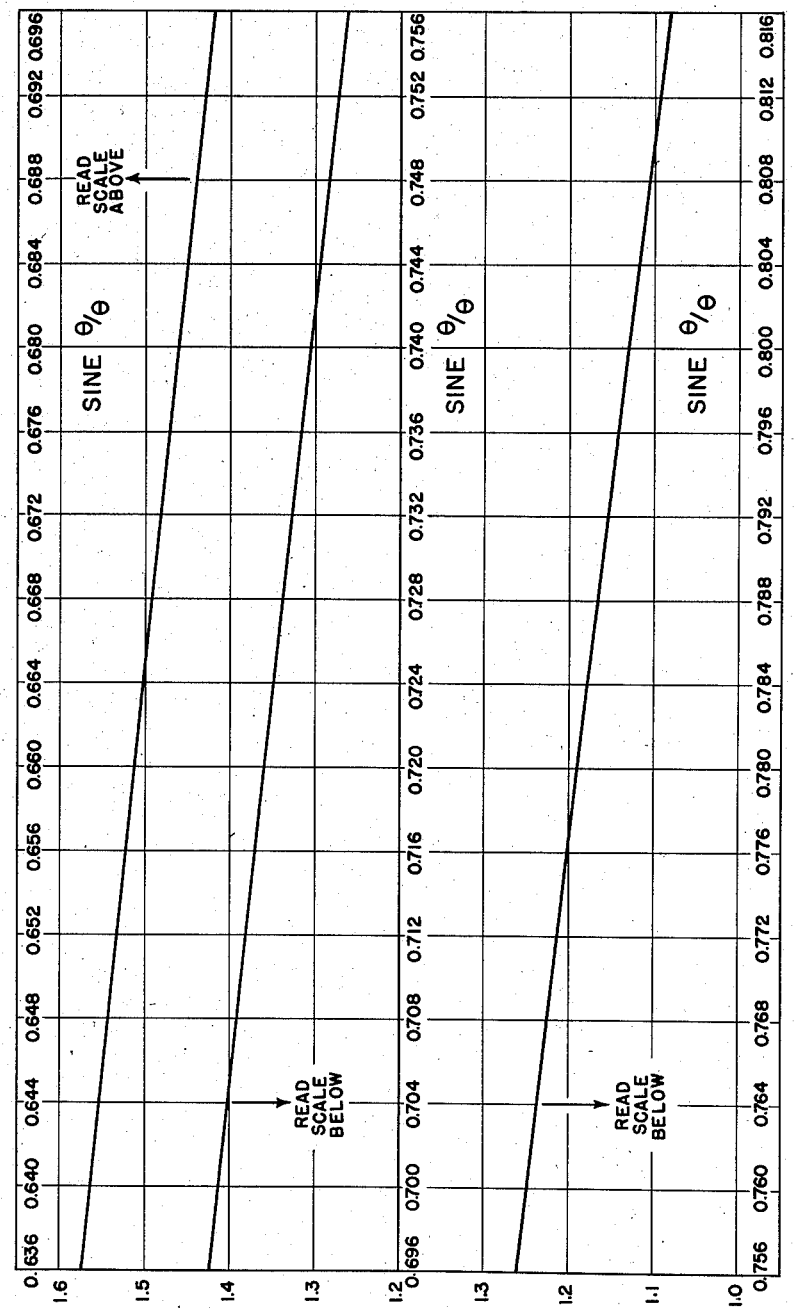

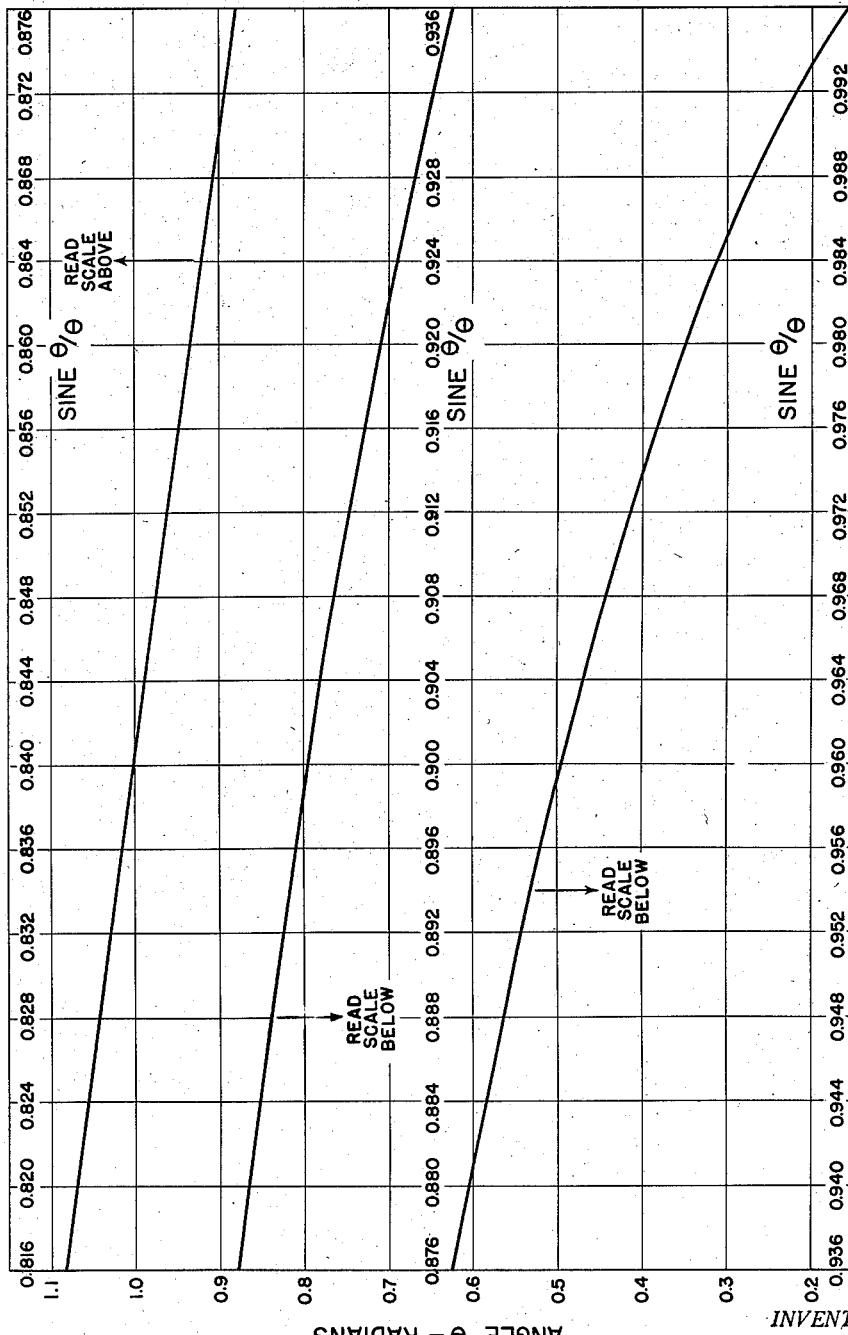

2,874,713

DIAPHRAGM MECHANISM

Robert E. Ochs, Jr., Oreland, and Robert B. Watrous, Philadelphia, Pa., assignors to Minneapolis-Honeywell Regulator Company, Minneapolis, Minn., a corporation of Delaware Application October 8, 1954, Serial No. 461,084

8 Claims. (Cl. 137—85)

The general object of our present invention is to provide a novel and useful diaphragm mechanism having a movable portion which moves by increments directly proportional to changes in a loading force applied thereto. This mechanism can be made to operate just as a metal spring does.

More specifically, one object of this invention is to provide a novel diaphragm mechanism comprising a pair of slack, flexible diaphragms held stationary at their peripheral portions and connected together and free to move at their central portions. A pressure is applied to one side, for example, the outer side of each of these diaphragms and another, different pressure is applied to the other, for example, the inner side of each of these diaphragms. As a result of the difference between these pressures, the diaphragms bulge or bow and tend to move away from one another and to assume a normal or zero position. This difference in pressure applies a force to the diaphragms which may be called the biasing force. If a loading force is applied so as to cause the diaphragm to move away from their normal or zero position, which the diaphragms assume as a result of the biasing force, the diaphragms will move linearly, i. e. by increments which are substantially directly proportional to the changes in the loading force. This loading force may be, for example, a weight applied to a pan or other part of the movable, central portion of the diaphragms. Or different pressures may be applied to an additional diaphragm or otherwise so as to apply the loading force to the movable, central portion of the diaphragms.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described preferred embodiments of the invention.

Of the drawings:

Fig. 1 is a sectional elevation of one desirable embodiment of the present invention;

Fig. 2 illustrates a modification of said embodiment;

Fig. 3 is a sectional elevation of a modified form of apparatus according to the present invention;

Fig. 4 is a sectional elevation of a second modified form of such apparatus; and Fig. 5 is a sectional elevation of another modified form similar to that of Fig. 4.

Fig. 6 is a longitudinal cross section showing the modification of Fig. 1 in the position it assumes when no biasing force is applied by means of the air pressure applied to the space between the diaphragm.

Fig. 7 is a longitudinal cross section showing this modification in its normal or zero position.

Fig. 8 is a longitudinal cross section showing this modification in the position it assumes when the biasing force is modified by a loading force.

Fig. 9 is a longitudinal cross section similar to Fig. 8 with lines useful in explaining the operation of the device.

Figs. 10 and 11 are graphs showing the values of angle theta ($\theta$) against the sine of the angle theta divided by the angle theta.

In the form of the invention illustrated in Fig. 1, by way of example, A designates a rigid cylinder forming the body portion or outer wall of a diaphragm mechanism comprising diaphragm sheets or membranes B and b which are equal in size. The latter, as shown, have their peripheral edges secured by clamping rings C at the opposite ends of the cylinder A. The radius, i. e. the distance from the center to the circumference, of the diaphragms B and b and, consequently, the diameter of these diaphragms, is greater than the radius or diameter of the interior of the body portion A because the diaphragms B and b are slack. As shown, the diaphragm elements B and b have similar, rigid, central, disc elements D and d, respectively, which are integrally connected by a shaft E within and coaxial with the cylindrical space surrounded by the cylinder A. The area of one of the disc elements D and d is less than three percent of the area of one of the diaphragms B and b. The diaphragm members B and b are normally in the form of slack membranes which bend but do not stretch and which bulge toward or away from one another when fluid under pressure, for example, compressed air, is applied to the outside of the diaphragms or fills the chamber F enclosed by the diaphragms and the annular wall A. As shown, a conduit G connects the bellows space F to a source of fluid under pressure, such, for example, as compressed air.

The mechanism operates with the diaphragms disposed in a generally horizontal or, preferably, in a generally vertical position. If there is no difference between the pressures applied to the opposite sides of the diaphragms, the diaphragms assume a position dictated by the weight of the central portions D and d of the diaphragms and the weight of the shaft E. The diaphragms do not bulge or arch in opposite directions because there is no force causing them to do so. Now, if a pressure is applied to one side of each of the diaphragms, for example, the inner side, which is different from the pressure applied to the other side of the diaphragms, for example, the outer side, the diaphragms will tend to move away from each other. This causes the central portions D and d of the diaphragms B and b to be in substantially the same plane as their stationary outer edges. This central position is the normal or zero position of the mechanism. If a loading force, for example, a weight, is applied to the central portions D and d of the diaphragms B and b, this force will tend to displace the movable, central portions D and d of the diaphragms from this normal or zero position. This is true no matter which direction axially of the shaft E that the loading force acts. As the central portions of the diaphragms B and b move away from their zero or normal position, for example, down, the area of the diaphragm B increases and the area of the diaphragm b decreases, a net area, B minus b is produced. The different pressures acting on the opposite sides of the diaphragms B and b and consequently on this net area, B minus b, produce a restoring force which is analogous to the force of a spring. This restoring force is in opposition to the loading force no matter in which direction the loading force is applied. The gradient of this restoring force depends upon the rate of change of the above mentioned net area and upon the magnitude of the difference between the pressures applied to the opposite faces of each of the diaphragms. This gradient can be varied by changing the pressure applied. This restoring force varies linearly. Thus, the diaphragm mechanism acts as a pneumatically operated spring.

An extension of shaft E carries a transverse index element k cooperating with a stationary scale K to provide a measure of the movement of the index k along the scale K as the loading force on the movable portions D and d of the diaphragms B and b varies.

A more detailed description of the structure and mode of operation of the device as shown in Fig. 1 is to be found in Figs. 6, 7, and 8.

Fig. 6 shows a device before pressure is applied to the chamber F. Since the pressure on the inner sides and on the outer sides of the diaphragms B and b are the same, these diaphragms sag under the weight or loading force applied to the shaft E. This causes the diaphragms B and b to assume the shape of frustums of cones.

If an elastic fluid is fed under pressure through the conduit G to the chamber F, the diaphragms B and b bulge or bow away from one another and assume the normal or zero position as shown in Fig. 7. In this position the central portions D and d of the diaphragms B and b are in substantially the same plane as their stationary outer edges. If the device is disposed with the longitudinal axis of the shaft E horizontal, there is no weight or other loading force on the diaphragms B and b when they are in this normal or zero position.

If a loading force, for example, a weight, is applied to the central portions D and d of the diaphragms B and b, this force causes the diaphragms to assume the position in which they are shown in Fig. 8. From Fig. 8 it will be seen that the upper diaphragm B has a peak or anode adjacent the casing A. The effective area of the diaphragm B is the area whose diameter is the distance between these peaks. This distance is shown in Fig. 8 as the diameter ABA. Likewise, the lower diaphragm b has a valley or node adjacent the shaft E. The effective area of diaphragm b is the area whose diameter is aba. This area is much smaller than the area of the effective portion of the upper diaphragm B. Because of this difference in effective areas there is a biasing or restoring force, due to the pressure in the chamber F acting in opposition to the loading force. The biasing or restoring force acts in opposition to the loading force no matter in which direction the loading force is applied.

As will be apparent, the embodiment of the invention illustrated by way of example in Fig. 1, may take various forms, and in Fig. 2, we have illustrated by way of example, one of the various modifications of the apparatus shown in Fig. 1, which may be made. The apparatus shown in Fig. 2 comprises two cup-shaped members AA and aa. The upper portion of the member AA is like the upper portion of the member A of Fig. 1, but the member AA has a rigid bottom wall. The member aa while similar in form to the member AA, is inverted so that the rigid end walls H and h of the members AA and aa are adjacent one another, and the diaphragm BA is above, and the diaphragm ba is below each of the walls H and h. The diaphragm BA is shown as attached to the upper end of the stationary part AA, as the part B of Fig. 1 is attached to the stationary part A. The diaphragm BA of Fig. 2 may be, and as shown, is like the diaphragm B of Fig. 1 except in respect to the manner in which the central portion DA of the diaphragm BA is operatively connected to the diaphragm da of the element aa. The diaphragm elements BA and ba of Fig. 2 may be identical in form with the diaphragm elements B and b of Fig. 1.

The discs DA and da of Fig. 2 are rigidly connected by one or more yoke members EA, two yoke members being shown. Each yoke member EA is connected by an arm EB to the rigid central portion DA of the diaphragm element BA, and is connected by an arm eb to the portion of the yoke EA beneath the cup-shaped member aa. The chambers between the diaphragm elements and rigid end walls of the stationary members AA and aa are connected to a source of fluid under variable pressure by a fluid supply pipe GA which is connected through a pipe GB to each of the chambers fa and FA. As will be apparent, the separation of the diaphragms BA and ba of Fig. 2 by walls of the chambers FA and fa, constitutes a structural difference between the elements shown in Figs. 1 and 2, but the diaphragms BA and ba function in the same manner as to the diaphragm elements B and b of Fig. 1. As will be apparent, the structurally different arrangements shown in Figs. 1 and 2 are not significant from the functional standpoint. In effect, the chambers FA, fa and connecting pipe GB collectively form a pressure chamber between the diaphragms BA and ba, analogous to the Fig. 1 pressure chamber F between the diaphragms B and b.

Fig. 3 shows how the diaphragm mechanism of this invention may be employed as a force balance device to extract square root. In this modification, an input pressure P(in) is applied through an inlet conduit L2 to an input member comprising a casing, generally indicated at L, and having a rigid wall L1 and a movable wall L3 formed by a rigid, slidable piston L3 which is connected at its central, movable portion DL to a shaft E. The piston L3 is free to move along the axis of shaft E in response to any force applied thereto, but the area (A1) of the piston head remains constant. Equations which show how this device operates to extract square root are given below in connection with the description of Fig. 4.

Fig. 4 shows how the diaphragm mechanism of this invention may be employed as a force balance device to extract square root. In this modification, an input pressure P(in) is applied through an inlet conduit BE1 to an input member comprising a casing, generally indicated at BE, and having a rigid base BE2 and a movable wall BE3 formed by a flexible bellows which is connected at BE4 to a shaft E. The central portion of bellows walls BE4 is free to move along the axis of shaft E but the area (AB) of the bellows remains constant.

The element to which the input pressure P(in) is applied can be other than a bellows. For example, the input pressure P(in) can be applied in the form of a differential pressure to a diaphragm connected through some pressure-tight construction, such as a sealing bellows to shaft E. The only limitation is that the movements of the element, to which the input pressure P(in) is applied, must be so small that changes (if any) in the area of the input element can be disregarded. By applying a differential pressure to a diaphragm to supply the loading force, a flow meter can be constructed in which the square root of the differential pressure can be extracted so that the output of the flow meter is linear and can be indicated on a scale having equal divisions.

The novel diaphragm mechanism of this invention comprises, as has been described above, a rigid cylinder A to which are attached diaphragms B and b having an area net (AD). Clamping rings C attach the peripheral edges of the diaphragms B and b to the opposite ends of the cylinder A. The central, movable portions D and d of the diaphragms B and b are connected to the shaft E. The lower end E1 of shaft E cooperates with a normally stationary, adjustable nozzle N which actuates a pilot valve or relay so as to supply an output pressure, designated P(out), in conduit G. This output pressure is fed back to the inner faces of the diaphragms B and b. If the pilot valve or relay has a sufficient gain, it will give a linear pressure-position characteristic. The output pressure P(out) acts on the area (AD) of the diaphragms B and b. This area changes linearly with position X. Such a pilot valve or relay is a well known, commercially available article, such as is disclosed in U. S. Patent 2,125,081, patented July 26, 1938, to C. B. Moore.

In order to discuss the theory of deflection of non-metallic diaphragms of various types, it is desirable to introduce the conceptions of effective force and effective area. Slack diaphragms possess the advantage over metallic diaphragms, at least for purposes of design, that the force which such a diaphragm is capable of exerting at its center can be computed when the geometrical properties of the diaphragm, the differential pressure applied, and the magnitude of the deflection are known.

Suppose that the diaphragms B and $b$ (Figs. 6 and 9) are subjected to the pressure $Pr$ of a supply of compressed air applied to the adjacent or confronting faces of the diaphragms. The centers of the diaphragms will deflect out of the neutral plane until they come to a position such that loading force $Fr$ at their centers (due to a weight, a piston and cylinder, a bellows, etc.) just balances the upward restoring or biasing force due to the pressure. Let $Dr$ equal the diameter of the casing A and $Ar$ equal the horizontal projection ($\frac{1}{4}$ pi $Dr^2$) of the area of diaphragm B or $b$. Then the vertical component of the total force on each diaphragm is equal to $\frac{1}{4}$ pi $Dr^2Pr$ or to $ArPr$. Not all of this force is available at the center of the diaphragm, however, since there is, in general, a reaction at the rim. A certain fraction of this force, equal in magnitude to the oppositly generated force $Fr$, is applied at the center. This is called the effective force for the given pressure $Pr$ for a given pressure element, such as diaphragm B or $b$. It will be shown presently that this effective force depends also on the deflection of the center of the diaphragm.

Since a certain fraction of the total force is available at the center of the diaphragm, it may be considered that this force is due to the product of the pressure $Pr$ and an area $A_E$, $A_E$ being less than $Ar$. This area $A_E$ may be called the effective area. The effective area for a given diaphragm is not, in general, a constant but is a function of the deflection of the center of the diaphragm.

From the above considerations, it follows that $$ArPr = Fr + Fa$$

where $Fa$ is the vertical component of the reaction at the rim. Also $$A_E Pr = Fr$$

whence $$A_E/Ar = Fr/Fr + Fa$$

Experiments made with diaphragms constructed according to this invention yield data which, when plotted according to the foregoing formulas, prove that the restoring or biasing force varies linearly with displacement of the diaphragms.

To compute the theoretical effective area of the diaphragms B and $b$ and to prove that this effective area varies linearly as a function of the deflection with the deflection of the shaft E, reference is made to Figs. 9, 10 and 11.

In this analysis and computation the following assumptions are made:

(1) The exposed portion of each of the diaphragms cut by a perpendicular diametral plane is the arc of a circle;
(2) The diaphragm material does not stretch; and
(3) The diaphragm material can transmit no shear forces.

These assumptions as to the properties of the diaphragm material do not hold strictly true for actual diaphragm materials. For theoretical accuracy the effects of stretching of the material and transmission of shear forces by the material must be taken into account. The assumptions here made yield valid results for commercial manufacturing purposes.

From considerations of the geometry of a diaphragm whose cross section is the arc of a circle, it can be proved that $$\frac{2 \sin \frac{1}{2}a}{a} = \frac{\sqrt{c^2+y^2}}{s}$$

where $a$ is the angle subtended by the arc of convolution $s$.

In Figure 9:

(1) $y$ = deflection of the disc elements D and $d$
(2) $h$ = high point of the arc of convolution
(3) $s$ = arc length of the exposed portion of the diaphragm
(4) $c$ = clearance between the disc elements D and $d$ and the outer rigid
(5) $R$ = radius of the disc elements D and $d$
(6) $p$ = distance from the edge of disc elements D and $d$ to the vertical line through $h$ Substituting $\theta$ for $\frac{1}{2}$ $a$ in the equation $$\frac{2 \sin \frac{1}{2}a}{a} = \frac{\sqrt{c^2+y^2}}{s}$$

the equation becomes:

(1) $$\frac{\sin \theta}{\theta} = \frac{\sqrt{c^2+y^2}}{s}$$

Dividing numerator and denominator of the right side of the equation by $c$ to make it applicable to diaphragms of any size:

(2) $$\frac{\sin \theta}{\theta} = \frac{\sqrt{1+(y/c)^2}}{s/c}$$

From Figure 9:

$$p = c - x = c - r \cos (3-2)$$
$$= c - r (\cos 3 \cos 2 + \sin 3 \sin 2)$$

By substitution and simplification:

(3) $$p = c/2 - y/2 \tan \theta$$

The effective area of a diaphragm of any slackness ratio, $s/c$, can now be determined as a function of the deflection of the disc elements in the following manner.

(1) The values of $\sin \theta/\theta$ corresponding to assumed values of deflection, $y$, are calculated for a known and constant slackness ratio, $s/c$.
(2) From Fig. 10 which shows the graph of $\theta$ vs. $\sin \theta/\theta$ the value of the angle $\theta$ for each computed value of $\sin \theta/\theta$ is determined.
(3) Using Equation Number 2, the value of $\sin \theta$ corresponding to each angle $\theta$ determined in step number 2 is found.
(4) With Equation Number 3 the value of $p$ corresponding to each assumed value of $y$ is computed.
(5) Then the effective area of the diaphragm is given by the expression $A_E = \pi(R+p)^2$.
(6) Substituting from Equation Number 3, $$A_E = \pi \left( R + \frac{C}{2} - \frac{y}{2} \right)^2 \tan \theta$$

When the device is at rest with the rigid case A held stationary and the resultant forces applied thereto balance each other the following equation is true:

$P$(in) multiplied by $AB$ equals $P$(out) multiplied by $AD$

In this equation:
AB equals the area of the input bellows BE.
AD equals the net area of the output diaphragms B and $b$.
P(out) equals a constant C2 multiplied by X.
AD equals a constant C3 multiplied by X.
Substituting in the equation above, P(in) multiplied by AB equals C2 multiplied by C3 multiplied by $X^2$.
Therefore, X equals the square root of P(in) multiplied by AB divided by C2 multiplied by C3.
Therefore, P(out) equals C2 multiplied by the square root of P(in) multiplied by AB divided by C2 multiplied by C3.

Fig. 5 shows an improved modification in which the diaphragm mechanism of this invention may be employed as a force balance device to extract square root. In this modification, an input pressure P(in) is applied through an inlet conduit BE1 to an input member comprising a casing, generally indicated at BE, and having a rigid base BE2 and a movable wall BE3 formed by a flexible bellows BE3 which is connected at BE4 to a shaft E. The central portion of bellows end BE4 is free to move along its axis but the area (A1) of the bellows is a constant.

The novel diaphragm mechanism of this invention comprises, as has been described above, a rigid cylinder A to which are attached diaphragms B and b having a net area (A2). Clamping rings C attach the peripheral edges of the diaphragms B and b to the opposite ends of the cylinder A. The central portions D and d of the diaphragms B and b are connected to the shaft E. The upper end of shaft E is connected to arm M1 of lever M. Arm M2 of lever M cooperates with a stationary nozzle N, which actuates a pilot valve or relay so as to supply an output pressure, designated P(out), in conduit G. This output pressure is fed back to the inner faces of the diaphragms B and b. If the pilot valve or relay has a sufficient gain, it will give a linear pressure-position characteristic. The output pressure P(out) acts on the net area (A2) of the diaphragms B and b. This area changes linearly with position X.

Lever M is pivotally mounted on a stationary support P by means of crossed spring pivots P1 and P2 or the like.

A weight M3 is adjustable along arm M1 of lever M so that the zero point at which the input pressure P(in) equals the output pressure P(out) can be set at any value.

This modification permits the area A1 of bellows BE to be made more nearly equal to the area A2 of diaphragms B and b than would otherwise be the case.

The equations set forth above in connection with Fig. 4 are also valid in connection with Fig. 5.

While, in accordance with the provisions of the statutes, we have illustrated and described the best forms of embodiment of our invention now known to us, it will be apparent to those skilled in the art that forms of the apparatus disclosed herein may be modified structurally and in respect to their operative purposes without departing from the spirit of our invention as set forth in the appended claims, and in some cases certain features of our invention may be used to advantage without a corresponding use of other features.

Having now described our invention, what we claim as new and desire to secure by Letters Patent is:

1. A diaphragm mechanism comprising first and second slack, flexible, concavo-convex diaphragms, wall structure uniting with said diaphragms to form a pressure chamber interposed between the confronting sides of the two diaphragms, each diaphragm having a peripheral edge portion connected to a portion of said wall structure and coaxial with a central portion of said diaphragm, a mechanical connection between the central portions of the two diaphragms, the transverse cross section of said connection being not more than three percent of the area of one of the diaphragms, means for applying a loading force to the movable central portions of said diaphragms, and means for variably biasing the central portion of said diaphragms towards a normal position in which the difference between the areas of said diaphragms is at a minimum, whereby, if the central portions of said diaphragms are moved in either direction away from said normal position by the loading force, the central portions of the diaphragms oppose this loading force with a restoring force which varies linearly.

2. Means for supplying a linearly acting restoring force in opposition to a loading force, said means including, a pair of elements which bend but do not stretch and which have portions connected to a stationary support and portions connected together and movable by the loading force and by the restoring force and having pressure-responsive areas on opposite sides thereof, the pressure-responsive areas on opposite sides of each of said elements varying at a different rate upon movement of said elements from normal position, one of said areas on each of said elements being adjacent the corresponding area on the other element, and one of said areas on each of said elements being remote from the corresponding area on the other element, and means for applying to one of said pairs of corresponding areas, a fluid under a pressure different from the pressure applied to the other of said pairs of corresponding areas.

3. Means for securing an output force which varies as the square root of an input force, said means including, a movable shaft, an input member having a stationary portion connected to a support and a movable portion of constant area connected to said shaft, means for applying an input pressure between said stationary portion and said movable portion of said input member, thereby causing the area of said movable portion to remain constant despite its change in position, a pair of elements which have portions connected to a stationary support and portions connected to said shaft and having pressure-responsive areas on opposite sides thereof, the pressure-responsive areas on opposite sides of each of said elements varying at a different rate upon movement of said elements from normal position, one of said areas on each of said elements being adjacent the corresponding area on the other element and one of said areas on each of said elements being remote from the corresponding area on the other element, a pilot valve connected to a source of fluid under pressure, a nozzle connected to said pilot valve so as to operate it and located adjacent said shaft so that the flow of fluid through said nozzle is varied by the movement of said shaft, and an output conduit leading from said pilot to one of said pairs of corresponding areas of said elements so as to apply to said pair of corresponding areas a fluid under a pressure different from the pressure of a fluid applied to the other of said pairs of corresponding areas.

4. Means according to claim 3 in which said input member is a piston and cylinder.

5. Means according to claim 3 in which said input member is a bellows.

6. Means for securing an output force which varies as the square root of an input force, said means including, a lever, an input bellows having a portion connected to a stationary support and a movable portion connected to said lever, means for applying an input pressure to one side of said bellows, a movable shaft connected to said lever, a pair of elements which have portions connected to a stationary support and portions connected to said shaft and having pressure-responsive areas on opposite sides thereof, the pressure-responsive areas on opposite sides of each of said elements varying at a different rate upon movement of said elements from normal position, one of said areas on each of said elements being adjacent the corresponding area on the other element and one of said areas on each of said elements being remote from the corresponding area on the other element, a pilot valve connected to a source of fluid under pressure, a nozzle connected to said pilot valve so as to operate it and located adjacent said lever so that the flow of fluid through said nozzle is varied by the movement of said lever, and an output conduit leading from said pilot to one of said pairs of corresponding areas of said elements so as to apply to said pair of corresponding areas a fluid under a pressure different from the pressure of a fluid applied to the other of said corresponding pairs of areas.

7. Means according to claim 6 in which a counterweight is mounted on said lever so as to be movable therealong so that the zero point at which the input pressure equals the output pressure can be set at any value.

8. Diaphragm mechanism, including: a rigid, cylindrical casing; a pair of flexible, non-stretchable diaphragms of equal size and of greater diameter than said casing secured at their peripheries to said casing and extending across said casing to form a chamber enclosed by said casing and said diaphragms; a rigid connection securing the centers of said diaphragms together and leaving the major portions of said diaphragms slack; means applying a loading force to said connection transversely of said diaphragms causing the effective, pressure-responsive areas of said diaphragms to vary at different rates; and a conduit communicating with said chamber to admit elastic fluid to said chamber at a pressure which applies a restoring force to said diaphragms having a component acting on the unbalanced effective areas of said diaphragms and tending to move said diaphragms in opposition to said loading force.

References Cited in the file of this patent
UNITED STATES PATENTS

| | | |
|---|---|---|
| 2,443,891 | Buerschaper | June 22, 1948 |
| 2,520,547 | Hughes | Aug. 29, 1950 |
| 2,567,151 | Hornbostel | Sept. 14, 1951 |
| 2,584,455 | Hughes | Feb. 5, 1952 |
| 2,667,860 | Henderson et al. | Feb. 2, 1954 |